(12) United States Patent
Takahashi et al.

(10) Patent No.: US 11,189,844 B2
(45) Date of Patent: Nov. 30, 2021

(54) ALKALINE DRY CELL

(71) Applicant: Panasonic Intellectual Property Management Co., Ltd., Osaka (JP)

(72) Inventors: Yasufumi Takahashi, Hyogo (JP); Atsushi Fukui, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 158 days.

(21) Appl. No.: 16/490,269

(22) PCT Filed: Sep. 29, 2017

(86) PCT No.: PCT/JP2017/035380
§ 371 (c)(1),
(2) Date: Aug. 30, 2019

(87) PCT Pub. No.: WO2018/163485
PCT Pub. Date: Sep. 13, 2018

(65) Prior Publication Data
US 2020/0014039 A1 Jan. 9, 2020

(30) Foreign Application Priority Data
Mar. 9, 2017 (JP) .............................. JP2017-045396

(51) Int. Cl.
*H01M 6/06* (2006.01)
*H01M 4/06* (2006.01)
(Continued)

(52) U.S. Cl.
CPC ............... *H01M 6/06* (2013.01); *H01M 4/06* (2013.01); *H01M 4/38* (2013.01); *H01M 4/62* (2013.01)

(58) Field of Classification Search
None
See application file for complete search history.

(56) References Cited

U.S. PATENT DOCUMENTS 3,281,278 A 10/1966 Schaefer
6,586,139 B1 7/2003 Watanabe et al.
(Continued)

FOREIGN PATENT DOCUMENTS

JP S61-208753 A 9/1986
JP H02-226657 A 9/1990
(Continued)

OTHER PUBLICATIONS

International Search Report dated Jan. 9, 2018, issued in counterpart application No. PCT/JP2017/035380, with English translation. (4 pages).

*Primary Examiner* — Daniel S Gatewood
(74) *Attorney, Agent, or Firm* — Westerman, Hattori, Daniels & Adrian, LLP

(57) ABSTRACT

An alkaline dry cell includes a positive electrode; a negative electrode; a separator disposed between the positive electrode and the negative electrode; and an electrolytic solution contained in the positive electrode, the negative electrode, and the separator, wherein the electrolytic solution contains an alkaline aqueous solution. The negative electrode contains an additive and a negative electrode active material containing zinc; and the additive contains at least one selected from the group consisting of benzoic acid, phthalic acid, isophthalic acid, and salts of the foregoing. The amount of the negative electrode active material contained in the negative electrode is from 176 to 221 parts by mass relative to 100 parts by mass of water contained in the electrolytic solution. The amount of the additive contained in the negative electrode is from 0.1 to 1.0 part by mass relative to 100 parts by mass of the negative electrode active material.

4 Claims, 1 Drawing Sheet

(51) Int. Cl.
*H01M 4/38* (2006.01)
*H01M 4/62* (2006.01)

(56) References Cited

U.S. PATENT DOCUMENTS

| | | |
|---|---|---|
| 2003/0219650 A1 | 11/2003 | Saruwatari et al. |
| 2011/0039148 A1 | 2/2011 | Wang et al. |
| 2013/0065112 A1* | 3/2013 | Uzuka .................. H01M 4/50 429/169 |

FOREIGN PATENT DOCUMENTS

| | | |
|---|---|---|
| JP | H07-6759 A | 1/1995 |
| JP | 2003-338291 A | 11/2003 |
| WO | 2017/056491 A1 | 4/2017 |

\* cited by examiner

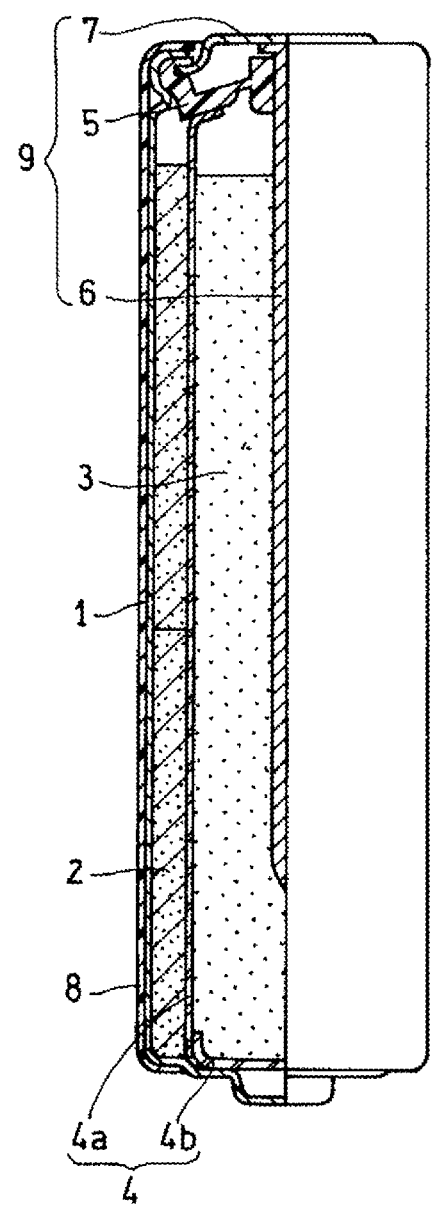

ALKALINE DRY CELL

TECHNICAL FIELD

The present invention relates to an improvement in the negative electrode of an alkaline dry cell.

BACKGROUND ART

Alkaline dry cells (alkaline-manganese dry cells) have a larger capacitance and enable a larger electric current to be drawn as compared with manganese dry cells; hence, alkaline dry cells have been widely used. An alkaline dry cell includes a positive electrode, a negative electrode, a separator disposed between the positive electrode and the negative electrode, and an alkaline electrolytic solution contained in each of the positive electrode, negative electrode, and separator. The negative electrode contains a negative electrode active material containing zinc. Such alkaline dry cells have been variously studied.

A technique in which the negative electrode contains aryl carboxylic acid as an anticorrosive for a negative electrode active material, for example, has been suggested (see Patent Literature 1).

CITATION LIST

Patent Literature

PTL 1: Japanese Published Unexamined Patent Application No. 61-208753

SUMMARY OF INVENTION

Technical Problem

In order to extend discharge duration without a change in the size of a cell (capacity inside the cell), the amount of an active material, particularly the amount of a negative electrode active material, needs to be increased, which forces the amount of an electrolytic solution to be decreased. In this case, the proportion of the amount of the negative electrode active material to the amount of the electrolytic solution (water) inside the cell becomes large.

Meanwhile, alkaline dry cells need to have an enhanced middle-rate intermittent discharge performance.

In middle-rate intermittent discharge, however, the depth of discharge increases, and an active material therefore needs to be utilized at high efficiency. Hence, in middle-rate intermittent discharge, an increase in the proportion of the amount of a negative electrode active material to the amount of the electrolytic solution inside the cell causes the electrolytic solution in the negative electrode to run short in the terminal stage of the discharge, and the surfaces of the particles of the negative electrode active material are therefore coated with an oxide layer, which results in easy passivation of the negative electrode active material. In other words, cell voltage is likely to sharply decrease in the terminal stage of discharge. In addition, the supply (transfer) of water from the negative electrode to the positive electrode is hindered. These problems cause a disadvantage in which an increase in the amount of the negative electrode active material does not lead to the extension of discharge duration in middle-rate intermittent discharge.

In Patent Literature 1, the relationship between aryl carboxylic acid and middle-rate intermittent discharge performance is not considered. The balance between the amount of an electrolytic solution (water) and the amount of a negative electrode active material and the relationship thereof with middle-rate intermittent discharge performance are not considered, either.

According to an aspect of the present disclosure, there is provided an alkaline dry cell including a positive electrode; a negative electrode; a separator disposed between the positive electrode and the negative electrode; and an electrolytic solution contained in the positive electrode, the negative electrode, and the separator, wherein the electrolytic solution contains an alkaline aqueous solution. The negative electrode contains an additive and a negative electrode active material containing zinc; the additive contains at least one selected from the group consisting of benzoic acid, phthalic acid, isophthalic acid, and salts of the foregoing. The amount of the negative electrode active material contained in the negative electrode is from 176 to 221 parts by mass relative to 100 parts by mass of water contained in the electrolytic solution (electrolytic solution inside the cell); and the amount of the additive contained in the negative electrode is from 0.1 to 1.0 part by mass relative to 100 parts by mass of the negative electrode active material.

According to the present disclosure, an alkaline dry cell having an excellent middle-rate intermittent discharge performance can be provided.

BRIEF DESCRIPTION OF DRAWINGS

FIG. 1 is a front view partially illustrating the cross section of an alkaline dry cell according to an embodiment of the present invention.

DESCRIPTION OF EMBODIMENTS

An alkaline dry cell according to an embodiment of the present invention includes a positive electrode; a negative electrode; a separator disposed between the positive electrode and the negative electrode; and an electrolytic solution contained in the positive electrode, the negative electrode, and the separator, wherein the electrolytic solution contains an alkaline aqueous solution.

The negative electrode contains an additive A and a negative electrode active material containing zinc. The additive A contains at least one selected from the group consisting of benzoic acid, phthalic acid (ortho-compound), isophthalic acid (meth-compound), and salts of the foregoing. The amount of the additive A contained in the negative electrode is from 0.1 to 1.0 part by mass relative to 100 parts by mass of the negative electrode active material. The amount of the negative electrode active material contained in the negative electrode is from 176 to 221 parts by mass relative to 100 parts by mass of water contained in the electrolytic solution (electrolytic solution inside the cell). The electrolytic solution inside the cell refers to an electrolytic solution contained in the positive electrode, negative electrode, and separator.

Using a specific amount of the additive A in the negative electrode enables an enhancement in middle-rate intermittent discharge performance in the case where the amount of the negative electrode active material contained in the negative electrode is increased to from 176 to 221 parts by mass relative to 100 parts by mass of water contained in the electrolytic solution. Such a specific amount of the additive A used in the negative electrode contributes to enhancements in the circulation of the electrolytic solution (water) among the particles of the negative electrode active material and the circulation of the electrolytic solution from the negative electrode to the positive electrode. In other words, the electrolytic solution is likely to move among the particles of the negative electrode active material and also from the negative electrode to the positive electrode. Hence, even when the amount of the electrolytic solution is relatively small, the electrolytic solution inside the negative electrode can be efficiently utilized in the terminal stage of middle-rate intermittent discharge. Accordingly, efficiency in the utilization of the negative electrode active material in middle-rate intermittent discharge is, for instance, improved, so that middle-rate intermittent discharge performance can be enhanced.

In the case where the amount of the additive A contained in the negative electrode is less than 0.1 part by mass relative to 100 parts by mass of the negative electrode active material, the effect attributed to the additive A is reduced. In the case where the amount of the additive A contained in the negative electrode is greater than 1.0 part by mass relative to 100 parts by mass of the negative electrode active material, the amount of the negative electrode active material used in the negative electrode is small, which results in a decrease in the middle-rate intermittent discharge performance.

The amount of the additive A contained in the negative electrode is preferably from 0.1 to 0.5 parts by mass relative to 100 parts by mass of the negative electrode active material, and more preferably from 0.15 to 0.50 parts by mass relative to 100 parts by mass of the negative electrode active material.

In the case where the amount of the negative electrode active material contained in the negative electrode is less than 176 parts by mass relative to 100 parts by mass of water contained in the electrolytic solution inside the cell, the amount of the negative electrode active material contained in the negative electrode is small, which results in a reduction in the middle-rate intermittent discharge performance. In the case where the amount of the negative electrode active material contained in the negative electrode is greater than 221 parts by mass relative to 100 parts by mass of water contained in the electrolytic solution inside the cell, the amount of the electrolytic solution (liquid) contained in the negative electrode is small, which also results in a reduction in the middle-rate intermittent discharge performance.

The amount of the negative electrode active material contained in the negative electrode is preferably from 184 to 214 parts by mass relative to 100 parts by mass of water contained in the electrolytic solution inside the cell.

The amount of the negative electrode active material contained in the negative electrode is, for example, determined through taking apart the dry cell to take out the negative electrode and then analyzing the negative electrode by ICP (inductively coupled plasma) atomic emission spectrophotometry.

The amount of water contained in the electrolytic solution inside the cell can be, for instance, determined as follows. A cell is taken apart, and its components (negative electrode, positive electrode, and separator containing the electrolytic solution) are taken out to determine the mass W1 of the components. The components taken out of the cell are subsequently dried; and the element contents of the materials used in the dried components (negative electrode, positive electrode, and separator containing components of the electrolytic solution other than water) are determined. Then, the masses of the materials are determined on the basis of the element contents. For example, the amount of manganese dioxide as a positive electrode active material is determined on the basis of the manganese content, and the amount of potassium hydroxide contained in the electrolytic solution is determined on the basis of the potassium content. The mass W2, which is the sum total of the masses of the individual materials, is drawn from the mass W1; and the resulting value is determined as the amount of water contained in the electrolytic solution inside the cell.

The additive A that is to be used is at least one selected from the group consisting of benzoic acid, phthalic acid, isophthalic acid, and salts of the foregoing. Examples of the salts include alkali metal salts, alkaline earth metal salts, ammonium salts, phosphonium salts, and amine salts. Examples of alkali metal salts include sodium salts and potassium salts. Examples of alkaline earth metal salts include magnesium salts and calcium salts.

The additive A is preferably benzoic acid because it enables production of excellent middle-rate intermittent discharge performance.

The amount of the additive A contained in the negative electrode is, for instance, determined through taking apart the dry cell to take out the negative electrode and measuring the amount of benzoate ions, phthalate ions, or isophthalate ions in the negative electrode by ion chromatography.

The negative electrode preferably further contains at least one selected from the group consisting of potassium fluoride and terephthalic acid (para-compound) as an additive B in an amount ranging from 0.05 to 0.5 parts by mass relative to 100 parts by mass of the negative electrode active material. Use of the additive B enhances the effect of efficiently utilizing the electrolytic solution (water) in the negative electrode due to the additive A, so that the middle-rate intermittent discharge performance is further enhanced. Unlike phthalic acid (ortho-compound) and isophthalic acid (meth-compound), terephthalic acid is less likely to be dissolved in the gelled negative electrode. In the case where the negative electrode contains terephthalic acid that is in the form of particles, merely the surfaces of the terephthalic acid particles are slightly dissolved in the negative electrode, and the most part thereof remains without being dissolved.

The amount of potassium fluoride contained in the negative electrode is, for example, determined through taking apart the cell to take out the negative electrode and measuring the amount of fluoride ions in the negative electrode by ion chromatography. The amount of terephthalic acid contained in the negative electrode is, for instance, determined through taking apart the cell to take out the negative electrode, adding the sufficient amount of water to the negative electrode to dissolve the terephthalic acid, and measuring the amount of the ions of the dissolved terephthalic acid by ion chromatography.

The positive electrode preferably contains manganese dioxide in an amount ranging from 457 to 507 parts by mass relative to 100 parts by mass of water contained in the electrolytic solution inside the cell. In this case, using the additive A enables the electrolytic solution (water) to appropriately move inside the cell, so that the electrolytic solution is contained in the positive and negative electrodes in a well-balanced manner even in the terminal stage of discharge. Hence, efficiency in the utilization of the positive electrode active material can be well enhanced, which leads to a sufficient enhancement in the middle-rate intermittent discharge performance.

The amount of manganese dioxide contained in the positive electrode is, for example, determined through taking apart the cell to take out the positive electrode and measuring the manganese content in the positive electrode by a volumetric analysis (such as chelatometric titration).

The negative electrode preferably contains the negative electrode active material in an amount ranging from 350 to 394 parts by mass relative to 100 parts by mass of water used in the electrolytic solution contained in the negative electrode. In the case where the amount of the negative electrode active material contained in the negative electrode is increased to from 350 to 394 parts by mass relative to 100 parts by mass of water used in the electrolytic solution contained in the negative electrode, using the additive A enables the middle-rate intermittent discharge performance to be sufficiently enhanced.

The amount of the water used in the electrolytic solution contained in the negative electrode is, for example, determined as follows: the cell is taken apart to take out the negative electrode, the negative electrode is analyzed by a thermal analysis, and the amount of the water is determined on the basis of a mass change in the thermal analysis. The temperature is increased from room temperature to 200° C. in the thermal analysis.

Examples of the alkaline dry cell according to an embodiment of the present invention include cylindrical cells and coin cells.

The alkaline dry cell according to the embodiment will now be described in detail with reference to the drawing. The present invention is not limited to the embodiment described below. Furthermore, the present invention can be appropriately modified without departing from the scope of the present invention. Moreover, the embodiment described below can be combined with another embodiment.

FIG. 1 is a front view illustrating the lateral half of the cross section of the alkaline dry cell according to an embodiment of the present invention. FIG. 1 illustrates an example of a cylindrical cell having an inside-out structure. With reference to FIG. 1, the alkaline dry cell includes a cylindrical hollow positive electrode 2, a gelled negative electrode 3 disposed inside the hollow part of the positive electrode 2, a separator 4 disposed therebetween, and an electrolytic solution (not illustrated); and these are accommodated in a bottomed cylindrical cell casing 1 that also serves as a positive electrode terminal. In the electrolytic solution, an alkaline aqueous solution is used.

The positive electrode 2 is disposed in contact with the inner wall of the cell casing 1. The positive electrode 2 contains manganese dioxide and an electrolytic solution. The gelled negative electrode 3 is in the hollow part of the positive electrode 2 with the separator 4 interposed therebetween. The negative electrode 3 contains a negative electrode active material, which contains zinc, and the additive A as well as normally an electrolytic solution and a gelling agent. The amount of the additive A contained in the negative electrode 3 is from 0.1 to 1.0 part by mass relative to 100 parts by mass of the negative electrode active material. The amount of the negative electrode active material contained in the negative electrode 3 is from 176 to 221 parts by mass relative to 100 parts by mass of water contained in the alkaline electrolytic solution inside the cell.

The separator 4 is in the form of a cylinder having a bottom and contains an electrolytic solution. The separator 4 includes a cylindrical separator 4a and a bottom sheet 4b. The separator 4a is disposed along the inner surface of the hollow part of the positive electrode 2 to separate the positive electrode 2 from the negative electrode 3. Accordingly, the separator disposed between the positive electrode and the negative electrode refers to the cylindrical separator 4a. The bottom sheet 4b is disposed at the bottom of the hollow part of the positive electrode 2 to separate the negative electrode 3 from the cell casing 1.

The opening of the cell casing 1 is sealed with a sealing unit 9. The sealing unit 9 includes a gasket 5, a negative electrode terminal plate 7 that also serves as a negative electrode terminal, and a negative electrode current collector 6. The negative electrode current collector 6 has been inserted into the negative electrode 3. The negative electrode current collector 6 is in the form of a nail having a head and body, the body has been inserted into a through-hole famed in the central cylindrical part of the gasket 5, and the head of the negative electrode current collector 6 has been welded to the central flat part of the negative electrode terminal plate 7. The opening end of the cell casing 1 has been swaged to the flange of the negative electrode terminal plate 7, which is at the periphery thereof, with the peripheral end of the gasket 5 interposed therebetween. The outer surface of the cell casing 1 is covered with an exterior label 8.

The detail of the alkaline dry cell will now be described.

(Negative Electrode)

Examples of the negative electrode active material include zinc and zinc alloys. A zinc alloy may contain at least one selected from the group consisting of indium, bismuth, and aluminum from the viewpoint of corrosion resistance. The amount of indium in the zinc alloy is, for example, from 0.01 to 0.1 mass %. The amount of bismuth in the zinc alloy is, for instance, from 0.003 to 0.02 mass %. The amount of aluminum in the zinc alloy is, for example, from 0.001 to 0.03 mass %. The proportion of an element other than zinc in the zinc alloy is preferably from 0.025 to 0.08 mass % in view of corrosion resistance.

The negative electrode active material is normally used in the form of powder. From the viewpoints of the repletion of the negative electrode and the diffusion of the electrolytic solution in the negative electrode, the average particle size (D50) of the powder of the negative electrode active material is, for example, from 100 to 200 µm, and preferably from 110 to 160 µm. The team "average particle size (D50) herein refers to a median size in the particle size distribution on a volume basis. The average particle size is, for instance, determined with a laser diffraction/scattering particle size distribution measuring apparatus.

The negative electrode is, for example, produced by mixing particles of a zinc-containing negative electrode active material, the additive A, a gelling agent, and an electrolytic solution with each other. The additive B may be optionally additionally used.

The gelling agent is any of known gelling agents used in the field of alkaline dry cells; for example, a water-absorbing polymer can be used. Examples of such a gelling agent include polyacrylic acid and sodium polyacrylate.

The amount of the gelling agent is, for example, from 0.5 to 2.5 parts by mass relative to 100 parts by mass of the negative electrode active material.

In the negative electrode, a surfactant, such as a polyoxyalkylene group-containing compound or a phosphate, may be used to adjust the viscosity or another property. In particular, for example, phosphates or alkali metal salts thereof are preferred. The surfactant is preferably added in advance to the electrolytic solution used in the production of the negative electrode in order to uniformly disperse the surfactant in the negative electrode.

The negative electrode may appropriately contain a compound containing a metal having a high hydrogen overvoltage, such as indium or bismuth, to improve corrosion resistance. The negative electrode may appropriately contain a small amount of a silicic acid compound, such as silicic acid or a potassium salt thereof to suppress the growth of dendrites of zinc or another material.

(Negative Electrode Current Corrector)

Examples of the material of the negative electrode current collector inserted into the gelled negative electrode include metals and alloys. The negative electrode current collector preferably contains copper and may be made of, for example, an alloy containing copper and zinc, such as brass. The negative electrode current collector may be optionally given a plating treatment, such as tin plating.

(Positive Electrode)

The positive electrode normally contains a conductive agent and an electrolytic solution in addition to manganese dioxide that is a positive electrode active material. The positive electrode may optionally further contain a binder.

The manganese dioxide is preferably electrolytic manganese dioxide. Examples of the crystal structure of the manganese dioxide include α type, α type, β type, γ type, ε type, η type, λ type, and ramsdellite type structures.

The manganese dioxide is used in the form of powder. The average particle size (D50) of the manganese dioxide is, for example, from 25 to 60 μm because such an average particle size easily ensures the repletion of the positive electrode and the diffusion of the electrolytic solution in the positive electrode.

The BET specific surface area of manganese dioxide may be, for example, in the range of 20 to 50 $m^2/g$ in view of formability and a reduction in the expansion of the positive electrode. The BET specific surface area is a surface area measured and calculated by using the BET equation that is a theoretical equation for multilayer adsorption. The BET specific surface area can be, for instance, measured with a specific surface area measuring apparatus based on a nitrogen adsorption method.

Examples of the conductive agent include carbon black, such as acetylene black, and conductive carbon materials, such as graphite. Graphite may be, for example, natural graphite or artificial graphite. The conductive agent may be, for instance, in the form a fiber but preferably in the form of powder. The average particle size (D50) of the conductive agent is, for example, from 3 to 20 μm.

The amount of the conductive agent used in the positive electrode is, for example, from 3 to 10 parts by mass, and preferably from 5 to 9 parts by mass relative to 100 parts by mass of manganese dioxide.

The positive electrode is, for example, produced by compressing a positive electrode mixture, which contains a positive electrode active material, a conductive agent, an alkaline electrolytic solution, and optionally a binder, into a pellet. The positive electrode mixture may be formed into flakes or granules and optionally sized in advance and then compressed into a pellet.

The pellet is placed in the cell casing and then secondarily pressurized with a predetermined instrument so as to be in close contact with the inner wall of the cell casing.

(Separator)

Examples of the material of the separator include cellulose and polyvinyl alcohol. The separator may be a non-woven fabric mainly containing fibers made of the above-described material or may be a microporous film, such as cellophane or a polyolefin film. A non-woven fabric and a microporous film may be used in combination. Examples of the non-woven fabric include a non-woven fabric in which mainly cellulose fibers and polyvinyl alcohol fibers have been mixed and a non-woven fabric in which mainly rayon fibers and polyvinyl alcohol fibers have been mixed.

In FIG. 1, the cylindrical separator 4a and the bottom sheet 4b constitute the bottomed cylindrical separator 4. Such a bottomed cylindrical separator is not limited thereto and may be any separator used in the field of alkaline dry cells and having known shapes. The separator may be famed of a single sheet; in the case where a thin sheet is used for the separator, multiple sheets may be superposed on one another to form the separator. A cylindrical separator may be formed by winding a thin sheet multiple times.

The thickness of the separator is, for example, from 200 to 300 μm. The separator preferably has such a thickness as a whole. When a thin sheet is used to form the separator, multiple sheets may be layered to the above-mentioned thickness as a whole.

(Electrolytic Solution)

The electrolytic solution is contained in the positive electrode, the negative electrode, and the separator. The electrolytic solution is, for example, an alkaline aqueous solution containing potassium hydroxide. The concentration of potassium hydroxide in the electrolytic solution is preferably from 30 to 50 mass %. The electrolytic solution may further contain zinc oxide. The concentration of zinc oxide in the electrolytic solution is, for instance, from 1 to 5 mass %.

(Cell Casing)

The cell casing is, for example, a metal casing having a bottomed cylindrical shape. The metal casing is, for instance, formed of a nickel-plated steel sheet. The cell casing is preferably a metal casing of which the inner surface is covered with a carbon coating film in order to give good adhesion between the positive electrode and the cell casing.

EXAMPLES

The present invention will now be specifically explained with reference to Examples and Comparative Examples but is not limited to Examples.

Example 1

A cylindrical alkaline dry cell (LR6) having an AA size and a structure illustrated in FIG. 1 was produced through the following procedures (1) to (3).

(1) Production of Positive Electrode

Graphite powder (average particle size (D50): 8 μm) as a conductive agent was added to electrolytic manganese dioxide powder (average particle size (D50): 35 μm) as a positive electrode active material to produce a mixture. The mass ratio of the electrolytic manganese dioxide powder to the graphite powder was 92.4:7.6. The specific surface area of the electrolytic manganese dioxide powder was 41 $m^2/g$. An electrolytic solution was added to the mixture, and the mixture was sufficiently stirred and then compressed into flakes to produce a positive electrode mixture. The mass ratio of the mixture to the electrolytic solution was 100:1.5. The electrolytic solution was an alkaline aqueous solution containing potassium hydroxide (concentration: 35 mass %) and zinc oxide (concentration: 2 mass %).

The positive electrode mixture in the form of flakes was pulverized into granules, and these granules were sized through screens of 10 to 100 mesh. Then, 11 g of the resulting granules were compressed into a predetermined hollow cylindrical shape having an outer diameter of 13.65 mm, thereby producing two pellets of positive electrode.

(2) Production of Negative Electrode

Zinc alloy powder (average particle size (D50): 130 μm) as a negative electrode active material, benzoic acid (BA) as the additive A, the above-mentioned electrolytic solution, and a gelling agent were mixed with each other to produce the gelled negative electrode 3. The zinc alloy was a zinc alloy containing 0.02 mass % of indium, 0.01 mass % of bismuth, and 0.005 mass % of aluminum. The gelling agent was a mixture of cross-linked branched polyacrylic acid and highly cross-linked linear sodium polyacrylate. The mass ratio of the negative electrode active material to the gelling agent was 100:1.

The amount of the benzoic acid (BA) in the negative electrode was 0.1 part by mass relative to 100 parts by mass of the negative electrode active material. The amount of the negative electrode active material was 378 parts by mass relative to 100 parts by mass of water contained in the electrolytic solution used in the production of the negative electrode.

(3) Assembling of Alkaline Dry Cell

The inner surface of a cell casing (outer diameter: 13.80 mm, wall thickness of cylindrical part: 0.15 mm, height: 50.3 mm) having a bottomed cylindrical shape and famed of a nickel-plated steel sheet was coated with Varniphite manufactured by Nippon Graphite Industries, Co., Ltd. to form a carbon coating film having a thickness of approximately 10 μm, thereby producing the cell casing 1. The two pellets of a positive electrode were vertically inserted into the cell casing 1 and then pressed to form the positive electrode 2 adhering to the inner wall of the cell casing 1. The separator 4 having a bottomed cylindrical shape was placed inside the positive electrode 2. The electrolytic solution was subsequently injected so that the separator 4 was impregnated with the electrolytic solution. The resulting product was left to stand in this state for a predetermined time until the electrolytic solution infiltrated the positive electrode 2 from the separator 4. Then, 6 g of the gelled negative electrode 3 was placed inside the separator 4.

In the above-mentioned procedure, the amount of the electrolytic solution (water) to be injected into the separator was adjusted such that the amount of the positive electrode active material was 482 parts by mass relative to 100 parts by mass of water contained in the electrolytic solution in the cell and that the amount A of the negative electrode active material was 202 parts by mass relative to 100 parts by mass of water contained in the electrolytic solution in the cell.

The separator 4 was composed of the cylindrical separator 4a and the bottom sheet 4b. Each of the cylindrical separator 4a and the bottom sheet 4b was a non-woven fabric sheet (basis weight: 28 g/m$^2$) in which mainly rayon fibers and polyvinyl alcohol fibers had been mixed with each other at a mass ratio of 1:1. The thickness of the non-woven fabric sheet used for the bottom sheet 4b was 0.27 mm. The separator 4a was famed by winding a 0.09-mm-thick non-woven fabric sheet three times.

The negative electrode current collector 6 was produced by pressing general brass (Cu content: approximately 65 mass %, Zn content: approximately 35 mass %) into a nail shape and then plating the surface thereof with tin. The diameter of the body of the negative electrode current collector 6 was 1.15 mm. The head of the negative electrode current collector 6 was electrically welded to the negative electrode terminal plate 7 formed of a nickel-plated steel sheet. The body of the negative electrode current collector 6 was subsequently pressed into the through-hole at the center of a gasket 5 mainly composed of polyamide 6 and polyamide 12. The sealing unit 9 including the gasket 5, the negative electrode terminal plate 7, and the negative electrode current collector 6 was produced through this process.

Then, the sealing unit 9 was placed at the opening of the cell casing 1. At this time, the body of the negative electrode current collector 6 was inserted into the negative electrode 3. The opening end of the cell casing 1 was swaged to the periphery of the negative electrode terminal plate 7 with the gasket 5 interposed therebetween, thereby sealing the opening of the cell casing 1. The outer surface of the cell casing 1 was covered with the exterior label 8. An alkaline dry cell A1 was produced in this manner.

Comparative Example 1

An alkaline dry cell X1 was produced as in Example 1 except that the additive A was not used in the production of the negative electrode.

Examples 2 to 4 and Comparative Examples 2 and 3

Alkaline dry cells A2 to A4 and X2 and X3 were produced as in Example 1 except that the amount of the additive A (amount per 100 parts by mass of the negative electrode active material) in the negative electrode was adjusted as shown in Table 1.

[Evaluation]

The produced cells were subjected to the evaluation of middle-rate intermittent discharge performance as described below.

Each of the cells discharged electricity for an hour under the environment of 20±2° C. and at a resistance of 3.9Ω per day. In this discharge of electricity, the discharge duration was measured until the closed circuit voltage of the cell reached 0.8 V. The discharge duration of each of the cells was converted to an index based on an assumption that the discharge duration of the cell X1 in Comparative Example 1 is 100.

Table 1 shows results of the evaluation. The team "(negative electrode active material/water in cell)" in Table 1 and Tables 2 to 6, which will be described later, refers to the amount of the negative electrode active material (part by mass) relative to 100 parts by mass of water contained in the electrolytic solution in the cell. The term "(negative electrode active material/water in negative electrode)" refers to the amount of the negative electrode active material (part by mass) relative to 100 parts by mass of water contained in the electrolytic solution in the negative electrode. The team "(positive electrode active material/water in cell)" refers to the amount of the positive electrode active material (part by mass) relative to 100 parts by mass of water contained in the electrolytic solution in the cell.

TABLE 1

|  | Cell No. | Type of Additive A | Amount of Additive A (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
| --- | --- | --- | --- | --- | --- | --- | --- |
| Comparative Example 1 | X1 | Unused | — | 202 | 378 | 482 | 100 |
| Comparative Example 2 | X2 | BA | 0.06 | 202 | 378 | 482 | 100 |

TABLE 1-continued

|  | Cell No. | Type of Additive A | Amount of Additive A (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
|---|---|---|---|---|---|---|---|
| Example 1 | A1 | BA | 0.10 | 202 | 378 | 482 | 103 |
| Example 2 | A2 | BA | 0.15 | 202 | 378 | 482 | 105 |
| Example 3 | A3 | BA | 0.50 | 202 | 378 | 482 | 106 |
| Example 4 | A4 | BA | 1.00 | 202 | 378 | 482 | 102 |
| Comparative Example 3 | X3 | BA | 1.00 | 202 | 378 | 482 | 98 |

BA: Benzoic acid

In the cells A1 to A4 of Examples 1 to 4, the amount of the negative electrode active material was 202 parts by mass relative to 100 parts by mass of water contained in the electrolytic solution in the cell, and the amount of the additive A was from 0.1 to 1 part by mass relative to 100 parts by mass of the negative electrode active material; these cells were excellent in middle-rate intermittent discharge performance.

In the cell X1 of Comparative Example 1, since the additive A was not used, the middle-rate intermittent discharge performance was low. In the cell X2 of Comparative Example 2 in which the amount of the additive A was 0.06 parts by mass relative to 100 parts by mass of the negative electrode active material, the amount of the additive A contained in the negative electrode was small, and the middle-rate intermittent discharge performance was therefore low. In the cell X3 of Comparative Example 3 in which the amount of the additive A was 1.1 part by mass relative to 100 parts by mass of the negative electrode active material, the amount of the negative electrode active material contained in the negative electrode was decreased, which resulted in the degradation of the middle-rate intermittent discharge performance.

Comparative Examples 4 to 7

The additive A was not used in the production of the negative electrode. The amount of the electrolytic solution in the cell and the amount of the negative electrode active material were adjusted so as to give the values of (positive electrode active material/water in cell) and (negative electrode active material/water in cell) shown in Table 2. The amount of the electrolytic solution used in the production of the negative electrode and the amount of the electrolytic solution injected into the separator were adjusted so as to give the values of (negative electrode active material/water in negative electrode) shown in Table 2. Except for these changes, alkaline dry cells X4 to X7 were produced as in Example 1 and subjected to the evaluation.

Examples 5 to 8 and Comparative Examples 8 and 9

The amount of the electrolytic solution in the cell and the amount of the negative electrode active material were adjusted so as to give the values of (positive electrode active material/water in cell) and (negative electrode active material/water in cell) shown in Table 2. The amount of the electrolytic solution used in the production of the negative electrode and the amount of the electrolytic solution injected into the separator were adjusted so as to give the values of (negative electrode active material/water in negative electrode) shown in Table 2. Except for these changes, alkaline dry cells A5 to A8 and X8 and X9 were produced as in Example 1 and subjected to the evaluation. Table 2 shows results of the evaluation.

TABLE 2

|  | Cell No. | Type of Additive A | Amount of Additive A (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
|---|---|---|---|---|---|---|---|
| Comparative Example 4 | X4 | Unused | — | 180 | 339 | 423 | 98 |
| Comparative Example 5 | X5 | Unused | — | 181 | 345 | 421 | 99 |
| Comparative Example 1 | X1 | Unused | — | 202 | 378 | 482 | 100 |
| Comparative Example 6 | X6 | Unused | — | 217 | 392 | 518 | 97 |
| Comparative Example 7 | X7 | Unused | — | 222 | 395 | 521 | 96 |
| Comparative Example 8 | X8 | BA | 0.50 | 175 | 339 | 417 | 99 |
| Example 5 | A5 | BA | 0.50 | 180 | 345 | 423 | 101 |
| Example 6 | A6 | BA | 0.50 | 184 | 351 | 434 | 104 |
| Example 3 | A3 | BA | 0.50 | 202 | 378 | 482 | 106 |
| Example 7 | A7 | BA | 0.50 | 214 | 389 | 451 | 104 |

TABLE 2-continued

| | Cell No. | Type of Additive A | Amount of Additive A (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
|---|---|---|---|---|---|---|---|
| Example 8 | A8 | BA | 0.50 | 217 | 392 | 518 | 101 |
| Comparative Example 9 | X9 | BA | 0.50 | 222 | 395 | 521 | 100 |

BA: Benzoic acid

In the cells A3 and A5 to A8 of Examples 3 and 5 to 8, the amount of the negative electrode active material was from 176 to 221 parts by mass relative to 100 parts by mass of water contained in the electrolytic solution in the cell, and the amount of the additive A was 0.5 parts by mass relative to 100 parts by mass of the negative electrode active material; these cells were excellent in middle-rate intermittent discharge performance.

In the cells X1 and X4 to X7 of Comparative Examples 1 and 4 to 7, although the amount of the negative electrode active material was increased to 176 parts by mass or more relative to 100 parts by mass of water contained in the electrolytic solution in the cell, the additive A was not used; hence, the middle-rate intermittent discharge performance was low.

In the X8 of Comparative Example 8 in which the amount of the negative electrode active material was 175 parts by mass relative to 100 parts by mass of water contained in the electrolytic solution in the cell, since the amount of the negative electrode active material contained in the negative electrode was small, the middle-rate intermittent discharge performance was low.

In the X9 of Comparative Example 9 in which the amount of the negative electrode active material was 222 parts by mass relative to 100 parts by mass of water contained in the electrolytic solution in the cell, the amount of the electrolytic solution (water) contained in the negative electrode was small, and thus the water in the negative electrode ran short in the terminal stage of electric discharge, which resulted in the degradation of the middle-rate intermittent discharge performance.

Examples 9 to 14 and Comparative Examples 10 and 13

In place of benzoic acid (BA) used as the additive A in the negative electrode, phthalic acid (PA) or isophthalic acid (IPA) was used. The amount of the additive A (amount per 100 parts by mass of the negative electrode active material) in the negative electrode was adjusted as shown in Table 3. Except for these changes, alkaline dry cells A9 to A14 and X10 to X13 were produced as in Example 1 and subjected to the evaluation. Table 3 shows results of the evaluation.

TABLE 3

| | Cell No. | Type of Additive A | Amount of Additive A (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
|---|---|---|---|---|---|---|---|
| Comparative Example 10 | X10 | PA | 0.05 | 202 | 378 | 482 | 99 |
| Example 9 | A9 | PA | 0.10 | 202 | 378 | 482 | 101 |
| Example 10 | A10 | PA | 0.15 | 202 | 378 | 482 | 104 |
| Example 11 | A11 | PA | 1.00 | 202 | 378 | 482 | 103 |
| Comparative Example 11 | X11 | PA | 1.10 | 202 | 378 | 482 | 98 |
| Comparative Example 12 | X12 | IPA | 0.05 | 202 | 378 | 482 | 99 |
| Example 12 | A12 | IPA | 0.10 | 202 | 378 | 482 | 101 |
| Example 13 | A13 | IPA | 0.15 | 202 | 378 | 482 | 104 |
| Example 14 | A14 | IPA | 1.00 | 202 | 378 | 482 | 102 |
| Comparative Example 13 | X13 | IPA | 1.10 | 202 | 378 | 482 | 97 |

PA: Phthalic acid,
IPA: Isophthalic acid

The cells A9 to A14 of examples 9 to 14 in which a certain amount of phthalic acid or isophthalic acid was used as the additive A in the negative electrode had an excellent middle-rate intermittent discharge performance.

Examples 15 to 22

In the production of the negative electrode, an additive B was additionally used. The additive B was potassium fluoride (KF) or terephthalic acid (TPA). The amount of the additive B (amount per 100 parts by mass of the negative electrode active material) was adjusted as shown in Table 4. Except for these changes, alkaline dry cells A15 to A22 were produced as in Example 1 and subjected to the evaluation. Table 4 shows results of the evaluation.

TABLE 4

| | Cell No. | Additive A Type | Additive A Amount (part by mass) | Additive B Type | Additive B Amount (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
|---|---|---|---|---|---|---|---|---|---|
| Example 3 | A3 | BA | 0.50 | — | — | 202 | 378 | 482 | 106 |
| Example 15 | A15 | BA | 0.50 | KF | 0.05 | 202 | 378 | 482 | 107 |
| Example 16 | A16 | BA | 0.50 | KF | 0.20 | 202 | 378 | 482 | 109 |
| Example 17 | A17 | BA | 0.50 | KF | 0.50 | 202 | 378 | 482 | 108 |
| Example 18 | A18 | BA | 0.50 | KF | 0.65 | 202 | 378 | 482 | 106 |
| Example 19 | A19 | BA | 0.50 | TPA | 0.05 | 202 | 378 | 482 | 108 |
| Example 20 | A20 | BA | 0.50 | TPA | 0.20 | 202 | 378 | 482 | 111 |
| Example 21 | A21 | BA | 0.50 | TPA | 0.50 | 202 | 378 | 482 | 109 |
| Example 22 | A22 | BA | 0.50 | TPA | 0.65 | 202 | 378 | 482 | 106 |

BA: Benzoic acid,
KF: Potassium fluoride,
TPF Terephthalic acid

In the cell A15 to A17 and A19 to A21 of Examples 15 to 17 and 19 to 21, additionally using a certain amount of the additive B in the negative electrode led to a further enhancement in the middle-rate intermittent discharge performance.

The cells A3, 24, and 25 of Examples 3, 24, and 25 in which (negative electrode active material/water in negative electrode) was in the range of 350 to 394 parts by mass had a further enhanced middle-rate intermittent discharge performance.

Examples 23 to 26

The amount of the electrolytic solution used in the production of the negative electrode and the amount of the electrolytic solution injected into the separator were adjusted so as to give the values of (negative electrode active material/water in negative electrode) shown in Table 5. Except for this change, alkaline dry cells A23 to A26 were produced as in Example 3 and subjected to the evaluation. Table 5 shows results of the evaluation.

Examples 27 to 30

The amount of the positive electrode active material (positive electrode mixture) was adjusted so as to give the values of the (positive electrode active material/water in cell) shown in Table 6. Except for this change, alkaline dry cells A27 to A30 were produced as in Example 3 and subjected to the evaluation. Table 6 shows results of the evaluation.

TABLE 5

| | Cell No. | Type of Additive A | Amount of Additive A (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
|---|---|---|---|---|---|---|---|
| Example 23 | A23 | BA | 0.50 | 202 | 349 | 482 | 102 |
| Example 24 | A24 | BA | 0.50 | 202 | 351 | 482 | 104 |
| Example 3 | A3 | BA | 0.50 | 202 | 378 | 482 | 106 |
| Example 25 | A25 | BA | 0.50 | 202 | 394 | 482 | 104 |
| Example 26 | A26 | BA | 0.50 | 202 | 395 | 482 | 103 |

BA: Benzoic acid

TABLE 6

| | Cell No. | Type of Additive A | Amount of Additive A (part by mass) | Negative electrode active material/water in cell (part by mass) | Negative electrode active material/water in negative electrode (part by mass) | Positive electrode active material/water in cell (part by mass) | Middle-rate intermittent discharge duration (index) |
|---|---|---|---|---|---|---|---|
| Example 27 | A27 | BA | 0.50 | 202 | 378 | 456 | 101 |
| Example 28 | A28 | BA | 0.50 | 202 | 378 | 458 | 102 |
| Example 3 | A3 | BA | 0.50 | 202 | 378 | 482 | 106 |
| Example 29 | A29 | BA | 0.50 | 202 | 378 | 507 | 102 |
| Example 30 | A30 | BA | 0.50 | 202 | 378 | 508 | 101 |

BA: Benzoic acid

The cells A3, 28, and 29 of Examples 3, 28, and 29 in which (positive electrode active material/water in cell) was in the range of 457 to 507 parts by mass had a further enhanced middle-rate intermittent discharge performance.

INDUSTRIAL APPLICABILITY

The dry cell according to an embodiment of the present invention can be used for any device powered by dry cells; for example, it can be suitably used in portable audio devices, electronic games, lighting devices, and toys.

REFERENCE SIGNS LIST

1: Cell casing
2: Positive electrode
3: Negative electrode
4: Bottomed cylindrical separator
4a: Cylindrical separator
4b: Bottom sheet
5: Gasket
6: Negative electrode current collector
7: Negative electrode terminal plate
8: Exterior label
9: Sealing unit

The invention claimed is:

1. An alkaline dry cell comprising a positive electrode; a negative electrode; a separator disposed between the positive electrode and the negative electrode; and an electrolytic solution contained in the positive electrode, the negative electrode, and the separator, wherein the electrolytic solution contains an alkaline aqueous solution;
the negative electrode contains an additive and a negative electrode active material containing zinc;
the additive contains at least one selected from the group consisting of benzoic acid, phthalic acid, isophthalic acid, and salts of the foregoing;
the amount of the negative electrode active material contained in the negative electrode is from 176 to 221 parts by mass relative to 100 parts by mass of water contained in the electrolytic solution; and
the amount of the additive contained in the negative electrode is from 0.1 to 1.0 part by mass relative to 100 parts by mass of the negative electrode active material,
wherein the negative electrode further contains at least one selected from the group consisting of potassium fluoride and terephthalic acid in an amount ranging from 0.05 to 0.5 parts by mass relative to 100 parts by mass of the negative electrode active material.

2. The alkaline dry cell according to claim 1, wherein the additive contains benzoic acid.

3. The alkaline dry cell according to claim 1, wherein the amount of the additive contained in the negative electrode is from 0.1 to 0.5 parts by mass relative to 100 parts by mass of the negative electrode active material.

4. The alkaline dry cell according to claim 1, wherein the positive electrode contains manganese dioxide in an amount ranging from 457 to 507 parts by mass relative to 100 parts by mass of water contained in the electrolytic solution.

* * * * *